(12) United States Patent
Yue

(10) Patent No.: US 6,782,497 B2
(45) Date of Patent: Aug. 24, 2004

(54) FRAME ERROR RATE ESTIMATION IN A RECEIVER

(75) Inventor: Lin Yue, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 09/957,850

(22) Filed: Sep. 20, 2001

(65) Prior Publication Data

US 2003/0056158 A1 Mar. 20, 2003

(51) Int. Cl.⁷ .................................................. H04L 1/20
(52) U.S. Cl. .................................................. 714/704
(58) Field of Search .......................................... 714/704

(56) References Cited

U.S. PATENT DOCUMENTS

| | | | |
|---|---|---|---|
| 5,581,577 A | * 12/1996 | Abe ............................ 375/225 |
| 6,154,659 A | 11/2000 | Jalali et al. ................... 455/522 |
| 6,359,935 B1 | * 3/2002 | Hui et al. ..................... 375/262 |
| 6,456,611 B1 | * 9/2002 | Hu et al. ...................... 370/342 |
| 6,490,461 B1 | * 12/2002 | Muller ......................... 455/522 |
| 6,539,205 B1 | * 3/2003 | Wan et al. .................... 370/465 |
| 6,609,008 B1 | * 8/2003 | Whang et al. ............... 455/522 |

OTHER PUBLICATIONS

Title "Physical Layer Standard For cdma2000 Spread Spectrum Systems".

* cited by examiner

Primary Examiner—Stephen M. Baker
(74) Attorney, Agent, or Firm—Aaron Waxler

(57) ABSTRACT

A frame error rate of received frames is estimated. Received frames are error correction decoded. It is determined whether an error correction decoded frame is a good frame. A decoded good frame is error correction encoded. The frame error rate is estimated on the basis of the error corrected good frame and a received frame.

21 Claims, 2 Drawing Sheets

FRAME ERROR RATE ESTIMATION IN A RECEIVER

BACKGROUND OF THE INVENTION

1. Field of the Invention

The present invention relates to a method of estimating a frame error rate of received frames, more particularly to such a method comprising error correction encoding and decoding.

The present invention further relates to a frame error rate estimator, and an apparatus comprising a frame error rate estimator.

Such a method, estimator, and apparatus are particularly useful in CDMA systems where frame error rate estimation is an integrated part of closed-loop power control, including an inner loop and an outer loop.

2. Description of the Related Art

In U.S. Pat. No. 6,154,659, fast forward link power control in a Code Division Multiple Access (CDMA) system is disclosed. In such a system a radiotelephone can assist a base station in the control of the power on the forward link (from the base station to the radiotelephone) by transmitting a power control message to the base station on the reverse link (from the radiotelephone to the base station). The radiotelephone gathers statistics of its error performance and informs the base station via a power control message. In such systems the ratio $E_b/N_0$ or $E_b/N_t$ is a standard quality measurement for digital communications system performance. The ratio expresses the bit-energy-to-noise-density of the received signal. The smaller the required $E_b/N_t$ the more efficient is the system modulation and detection process for a given probability of error. A related metric is the $E_s/N_t$, which is the ratio of symbol-energy-to-noise density of the received signal. The $E_s/N_t$ is related to the $E_b/N_t$ by $E_s/N_t=(E_b/N_t)N$ where N is the number of bits per symbol. The radiotelephone receives information from the base station. This information is in the form of a stream of data frames. The type and format of this data is well known in the art. The radiotelephone demodulates the information. The $E_s/N_t$ is estimated. In an inner loop, the estimated $E_s/N_t$ is compared to a target or setpoint $E_s/N_t$. The target $E_s/N_t$ is adjusted on a frame by frame basis. In an outer loop, the target is modified in such a way as to maintain a required frame error rate set by network operators. In order to modify the target $E_s/N_t$, the quality of each received frame is determined. If a particular received frame was good, the target is decreased a predetermined amount. If the particular received frame was bad, the target is increased by a predetermined amount. The predetermined amount is set by network operators. Determining the quality of the frames is well known in the art. If the estimated $E_s/N_t$ is less than the target $E_s/N_t$, the radiotelephone instructs the base station to power up by a predetermined amount. If the estimated $E_s/N_t$ is greater than the target $E_s/N_t$, the radiotelephone instructs the base station to power down by a predetermined amount. The power change commands are transmitted using a reverse power control signaling channel, are punctured in a data stream to the base station, or otherwise transmitted to the base station. Data to be transmitted from the base station to the radiotelephone are encoded using a convolutional encoder or another type of error correcting encoder so as to create redundancy in the original data sequence. Such redundancy improves error correction and signal reconstruction at the receiver. The receiver uses error correction techniques as it decodes the received data to reconstruct the original user data.

3GPP2 Standard "Physical Layer Standard for CDMA2000 Spread Spectrum Systems", Release A, publication date Jul. 13, 2001, pp. 2–62 to 2–67, 2–99 to 2–105, 2–125 to 2–127, 2–130 to 2–132, and 2–199 to 2–200 discloses reverse channel types for different radio configurations, including forward error correction types of channels, and convolutional or Turbo encoding on such channels. In addition to data, a frame quality indicator (CRC) is encoded in frames, a frame being a basic timing interval in the system. Such a CRC, Cyclic Redundancy Code, is a class of linear error detecting codes which generate parity check bits. The frame quality indicator is a CRC check that is applied to particular channels in the CDMA system. A mobile station applies an inner and outer power control loop for forward channel power control, and uses a reverse power control sub-channel transmit power control bits to the base station, the value of a power control bit depending on the value of a determined $E_b/N_t$ or $E_s/N_t$. The mobile station demodulation process performs complementary operations to the base station modulation process on the forward CDMA channel, including error correction decoding of received frames.

SUMMARY OF THE INVENTION

It is an object of the invention to provide a method of estimating a frame error rate of received frames that takes into account channel conditions of a channel conveying the frames.

It is another object of the invention to provide such a method in which a frame error rate of good frames is determined on the basis of received soft bits and re-encoded hard bits.

It is still another object of the invention to provide such a method of estimating a frame error rate of received frames using at least error correction decoded good frames.

In accordance with the invention, a method of estimating a frame error rate of received frames is provided, the method comprising:
  error correction decoding of a received frame;
  determining whether the error correction decoded frame is a good frame;
  error correction encoding of the good frame; and
  estimating the frame error rate on the basis of the error correction encoded good frame and the received frame.

The method is based on the recognition that for frame error rate estimation, in addition to using bad frames, advantageously use can be made of good frames, because, if the frame is correctly received, re-encoded hard bits that occur after error correction decoding and a successive frame quality check are exactly the same as the bits that were transmitted.

In an embodiment an N-tap filter such as a FIR-filter is used to filter frame error rates estimates of good and bad frames, and a noise distribution estimate, that is determined from the error correction encoded good frames and received frames, is used to determine filter coefficients of filtered frame error rate estimates. The noise distribution estimate takes into account effects of channels conditions on a channel conveying the frames, the received frames representing received soft bits.

Because typically there are much more received good frames than bad frames, use of good frames significantly speeds up estimation of the frame error rate and renders a reliable and robust estimation method. Also, because only relatively few frames are needed for obtaining good estimates, the methods are very suitable for fast changing channel conditions.

In an embodiment of the frame error rate estimation method a bit error rate is estimated using the error corrected good frame and the received frame, and the frame error rate is estimated using such a determined bit error rate. Preferably, such a bit error rate (BER) is first determined for a simple receiver such as a BPSK or QPSK receiver, and then, the BER and/or FER for a corresponding forward error correction receiver is determined, preferably through a lookup table that accounts for the coding gain of the forward error correction receiver. Such indirect determination of the BER and/or FER of a FEC receiver is much simpler that determining it directly for a FEC receiver.

In an embodiment of the frame error rate estimation method, the frame error rate is further estimated on the basis of error correction decoded bad frames. Although typically more good than bad frames should be received, such bad frames still contribute to frame error rate estimation.

For determining good frames quality indicators are included in the encoded frames at the transmitting end, such frame quality indictors being CRCs, or any other useful frame quality indicator.

Preferably, error correction encoding and decoding is forward error correction encoding and decoding, applying convolutional encoding and Viterbi decoding, Turbo encoding and decoding, or any other useful encoding or decoding mechanism.

In an embodiment, the frame error rate is estimated for a succession of consecutively received frames, thereby N-tap filtering frame error rate estimates of good and bad frames with diminished filter coefficients for older received frames. The diminishing filter coefficients for older frames effectively serve as a forgetting factor for the information contained in the received frames, good ones and bad ones. I.e., such N-tap filtering, preferably through using an N-tap FIR filter, determines which frames are important in the frame error rate estimation method. Preferably, the window of consecutively received frames is advanced by a predetermined number of frames, whereby the predetermined number of frames and the filter coefficients are determined by the chance in the noise distribution that reflects the change in the channel condition.

In an embodiment, a forward error correction encoder that is already present in a transmit path can also be used to re-encode the decoded hard bits. Through such shared use no additional hardware is needed for such re-encoding.

BRIEF DESCRIPTION OF THE DRAWING

Throughout the figures the same reference numerals are used for the same features.

DESCRIPTION OF THE DETAILED EMBODIMENTS

Figure 1:
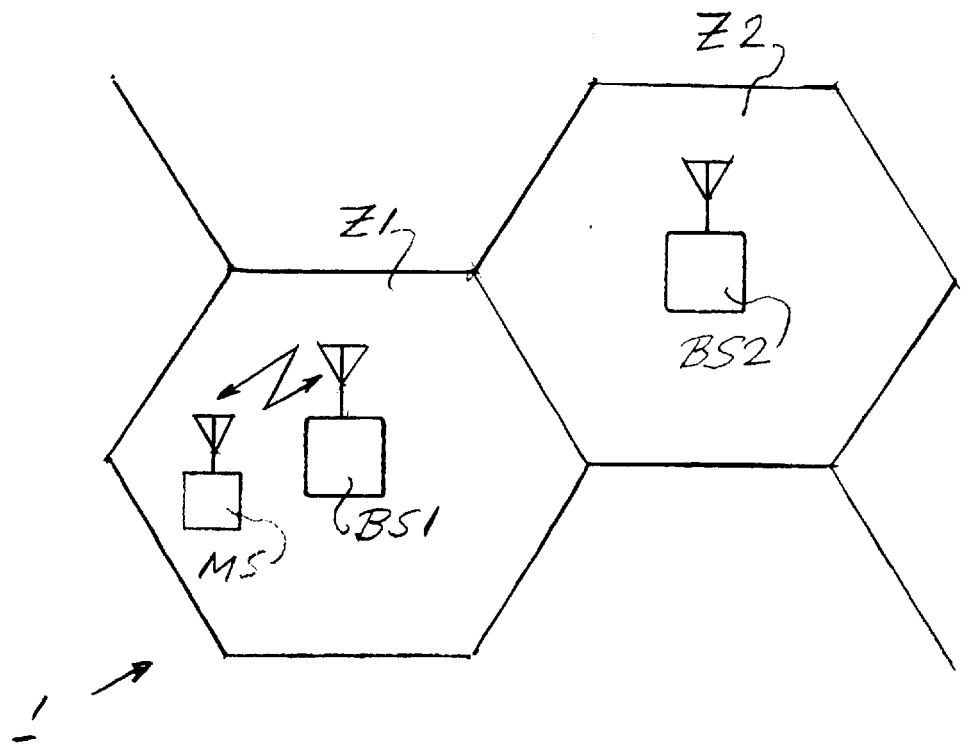
FIG. 1 schematically shows a cellular telephony system.

FIG. 1 schematically shows a digital cellular telephony system 1, in the present case a CDMA system. The system 1 comprises radio zones Z1 and Z2 that are respectively covered by radio base stations BS1 and BS2. Further shown is a mobile radio station MS in radio zone Z1. Mobile radio station MS has receive and transmit capability so as to be able to establish a two-way voice and/or data communication with radio base stations BS1 and BS2. Such cellular telephony systems are well known in the art. The present invention that applies error correction encoding and decoding to received frames may be implemented in such a mobile radio station MS, but also in any other suitable type of system or device that applies error correction encoding and decoding to received frames. In principle, the invention is not limited to cellular or wireless systems but also may be used in wired systems, in receive paths of transceivers, or in receivers. In the example given, the invention is implemented in a system that applies overall system power control whereby a mobile radio station assists a radio base station in controlling its power. Thereby, a mobile radio station, that receives frames on a so-called forward links from a radio base station to the mobile radio station estimates frame error rates at least on the basis of received good frames, and in dependence thereon instructs the base station, in a message on a so-called reverse link from the mobile radio station to the radio base station to increase or decrease its power.

Figure 2:
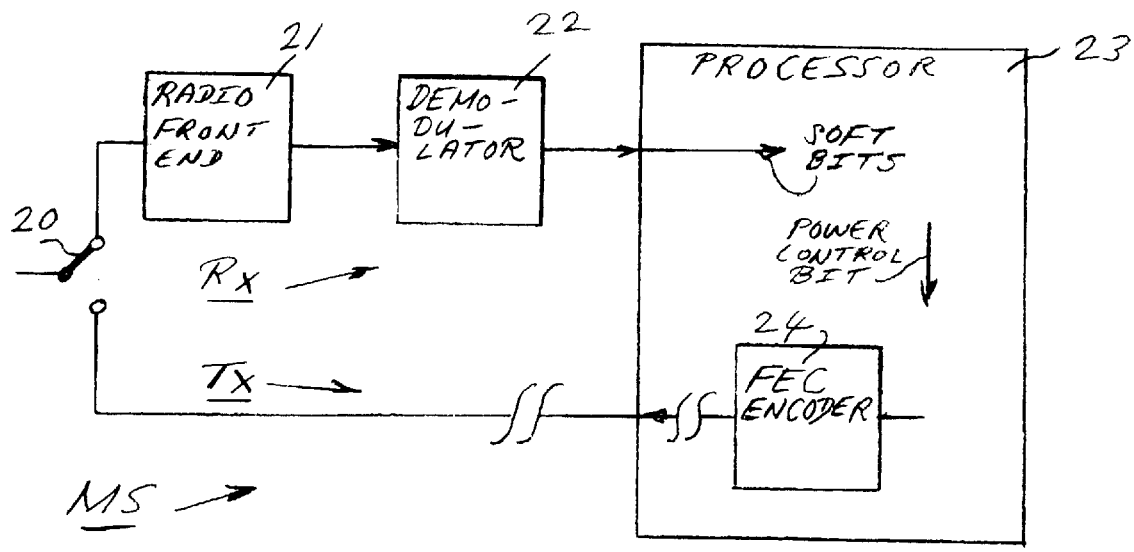
FIG. 2 shows a block diagram of a transceiver.

FIG. 2 shows a block diagram of mobile radio station MS, a transceiver with a receive path Rx and a transmit path Tx, coupled to a receive/transmit switch 20. Receive path Rx comprises a radio front end 21 that is coupled to a demodulator 22. In case of a CDMA system, the demodulator may comprise a so-called Rake receiver that outputs so-called soft bits. Receive path Rx and transmit path Tx are coupled to a processor 23 that performs further receive and transmit functionality and processing of digital signals. Receive functionality includes processing of soft bits and generation of a power control bit that is sent to a base station over transmit path Tx. Transmit functionality includes forward error encoding using forward error encoder 24. As will be described in the sequel, forward error encoder 24 used in transmit path Tx may be shared for use in frame error rate estimation for receive path Rx. Except for such shared use, such a receive and transmit path Rx and Tx as such are well-known in the art.

Figure 3:
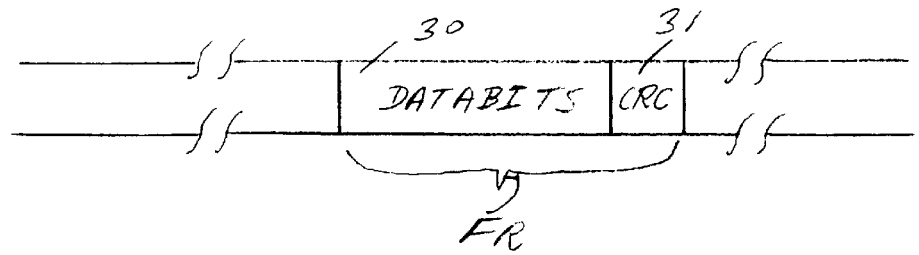
FIG. 3 shows a frame structure.

FIG. 3 shows a frame structure FR in a succession of received frames. Frame structure FR comprises data bits 30 and a frame quality indicator 31. Frame structure FR may be more complicated and include other types of information. For the purpose of illustrating the present invention, frame complexity is not essential, however. Frame quality indicator 31 may be a so-called Cyclic Redundancy Check CRC, a class of linear error detecting codes which generate parity check bits by finding the remainder of a polynomial division. At the receive end, frame quality indicator 31 is used to determine whether a received frame is a good frame or a bad frame. In view of the invention, other suitable frame quality indicators may be used. At the transmit end, data bits 30 were error correction encoded. At the receive end, in mobile radio station MS, in accordance with the invention error correction decoding of soft bits corresponding to received frames is applied, and further re-encoding of hard detected bits of received good frames, in order to obtain a noise distribution estimate of received frames and, indirectly, a frame error rate of received frames.

Figure 4:
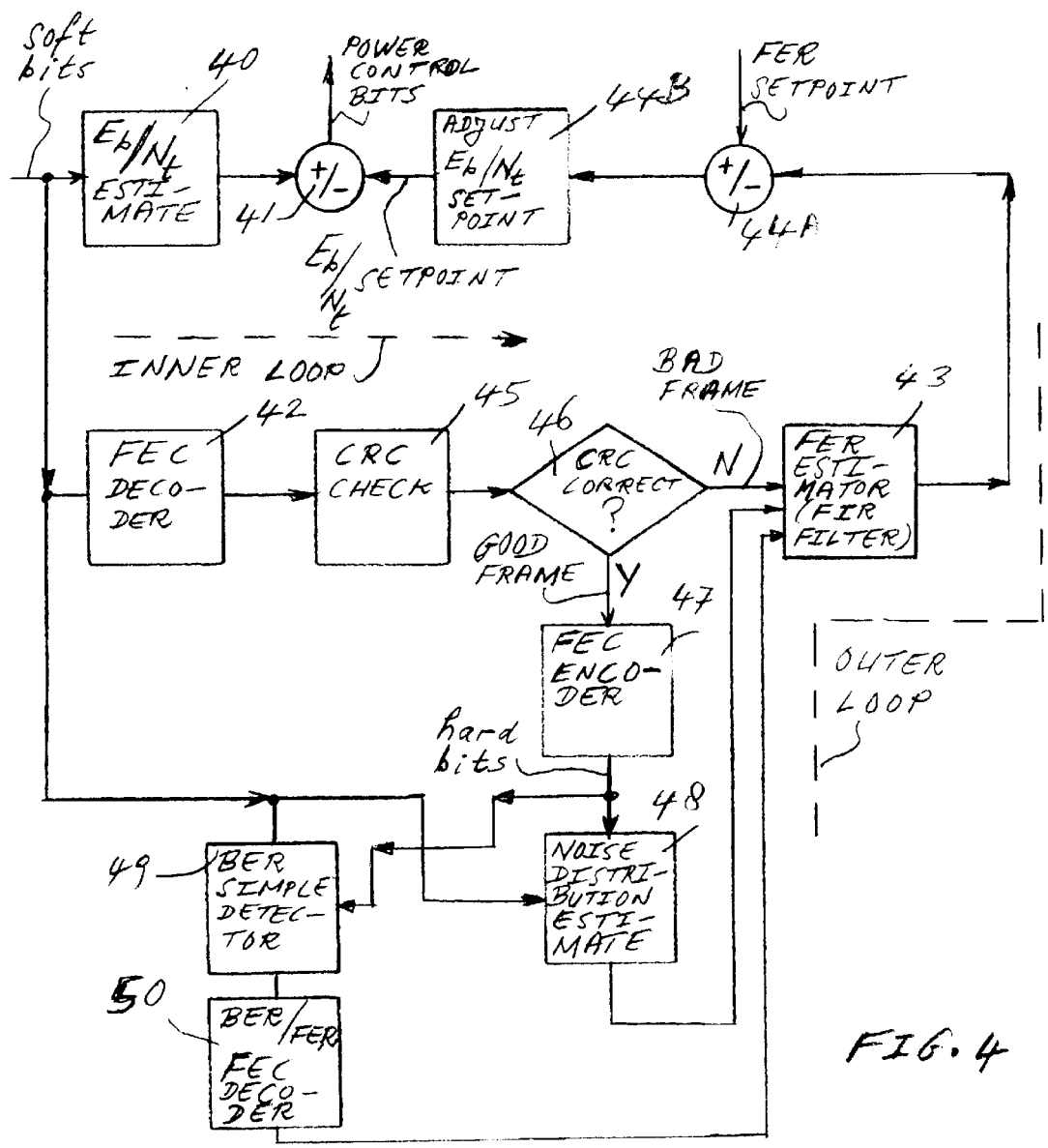
FIG. 4 shows an embodiment of the present invention.

FIG. 4 shows an embodiment of the present invention, implemented by processor 23 that contains non-volatile memory for stored programs and for storing non-volatile data, and volatile memory for storing volatile data. Processor 23 may be implemented in dedicated logic or other hardware, or as a combination of hardware and software. For providing power control bits, an inner loop comprises an $E_b/N_t$ estimator 40 that provides an $E_b/N_t$ estimate from the soft bits, and a comparator 41 comparing the $E_b/N_t$ estimate with an $E_b/N_t$ setpoint, $E_b$ being the bit energy and $N_t$ being the noise density of the received signal. The $E_b/N_t$ setpoint, or $E_s/N_t$ setpoint whereby $E_s$ is the symbol energy, is adjusted on a frame by frame basis. If the $E_b/N_t$ estimate is greater than the $E_b/N_t$ setpoint, the power control bit instructs the radio base station BS1 to power down. If the $E_b/N_t$ estimate is smaller than the $E_b/N_t$ setpoint, the power control bit instructs the radio base station to power up. The $E_b/N_t$ setpoint is adjusted in an outer loop comprising a forward error correction decoder 42, a frame error correction estimator 43, a comparator 44A for comparing a frame error estimate to a frame error rate setpoint that is set by a network operator, and a $E_b/N_t$ setpoint adjuster 44B. In accordance with the invention, the outer loop further comprises a CRC checker 45 that checks a CRC in a received frame and that is arranged in an output stream of FEC decoder 42. A CRC tester 46 provides indicators whether received frames are good or bad. FER estimator 43, in the example given a Finite Impulse Response (FIR) filter, processes FER estimates of good and bad frames. In accordance with the invention, good frames are re-encoded in FEC encoder 47 so as to obtain hard bits from a received frame. Because the frame is correctly received, the re-encoded hard bit decisions are exactly the same as the data bits transmitted at the transmit end, by radio base station BS1. By comparing received soft bits and re-encoded hard bits, the effects of channel conditions of a channel between radio base station BS1 and mobile radio station MS are seen. Instead of FEC encoder 47, FEC encoder 24 in transmit path Tx may be used, saving hardware. A noise distribution estimator 48 provides a noise distribution estimate from the soft bits and the hard bits of the received frame. A detector 49 for a simple receiver such as a BPSK or QPSK receiver determines a bit error rate (BER) from the soft bits and re-encoded hard bits. A FEC decoder 50 determines a corresponding BER and FER from an output of detector 49, preferably through a lookup table that accounts for a coding gain achieved by FEC decoder 50. FEC estimator 43 may process output data from FEC decoder 50. FEC is not limited to convolutional codes, a convolutional encoder and a Viterbi decoder, or to Turbo codes. Other suitable codes may be applied. For a number N of consecutive frames, N being an integer, FER estimates are obtained for good and bad frames, FER_i, i=1, 2, ..., C, C being the number of good frames, and B being the number of bad frames. For a bad frame the FER estimate simply is 1/N. For a good frame, the BER of a simple detector such as a BPSK or QPSK receiver is estimated using the soft bits and re-encoded hard bits. Then, the BER and FER of the FEC receiver are obtained by taking into account the coding gain. Hence, a stream of FERs, for good and bad frames, is obtained that is filtered. For example, with N=250 and receiving, in that order, 1 bad frame, 200 good frames, 1 bad frame, and 48 good frames (B=2, C=248), the input to FIR filter 43 is: 1/N, FER_1, FER_2, ..., FER_200, 1/N, FER_202, ... FER_249. An N-tap FIR filter is applied to determine which frames significantly contribute to FER estimation, i.e., more important frames. Diminishing filter coefficients for older frames in time effectively serve as a forgetting factor for data in corresponding frames. A window of N consecutive frames is advanced by M frames at a time, M being an integer. Parameters M and the filter coefficients are determined by a change in the noise distribution, which reflects a change in the channel condition, e.g. by using the noise variance. With filter coefficients k0, k1, k2, ..., k249, the FIR filter operation is k0*1/N+k1*FER_1+. . . +k200*FER_200+k201*1/N+k202*FER_202+. . . k249*FER_249. Advancing the N frames by M effectively changes the starting point of a stream of frames.

The invention thus has many advantages. In addition to using bad frames, use is made of good or correct frames to directly estimate the noise distribution and to indirectly estimate the frame error rate, thereby significantly speeding up FER estimation since typically there are much more good than bad frames. In additional thereto, channel conditions are taken into account by applying a forgetting factor for frames used in the FER estimation process. Further, information that is averaged over a few frames is used to update the FER estimate in order to minimize adverse effects any single frame might have.

The invention may be used in any system that includes frame checking and FEC operations. Such systems include CDMA systems, GSM systems, cable modem systems, or any other suitable system.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A method of estimating a frame error rate of received frames, said method comprising:
    error correction decoding of a received frame;
    determining whether said error correction decoded frame is a good frame on the basis of a frame quality indicator, wherein the received frame further comprises said frame quality indicator;
    error correction encoding of a frame determined to be a good frame in the determining step; and
    estimating said frame error rate on the basis of said error correction encoded good frame and said received frame.

2. A method as claimed in claim 1, wherein said quality indicator is a cyclic redundancy check.

3. A method as claimed in claim 1, wherein said error correction decoding is forward error correction decoding, and said error correction encoding is forward error correction encoding.

4. A method as claimed in claim 1, further comprising determining of a bit error rate using said received frame and said error correction encoded good frame, and said estimating of said frame error rate using said determined bit error rate.

5. A method as claimed in claim 4, said determining of said bit error rate first being done in accordance with less complex decoding not including error correction decoding, and then being done for error correction decoding thereby using said determined bit error rate in accordance with said less complex decoding.

6. A method as claimed in claim 5, thereby using a lookup table with a bit error rate relationship that accounts for a coding gain of said error correction decoding with respect to said less complex decoding.

7. A method as claimed in claim 1, further estimating said frame error rate on the basis of an error correction decoded bad frame.

8. A method as claimed in claim 7, said estimating of said frame error rate being done for a plurality of consecutively received frames, thereby N-tap filtering frame error rate estimates of good and bad frames.

9. A method as claimed in claim 8 further comprising determining a noise distribution estimate from said error correction encoded good frame and said received frame, and determining filter coefficients of said N-tap filtering from said noise distribution estimate.

10. A method as claimed in claim 9, said filter coefficients being diminished for older frames.

11. A method as claimed in claim 9, using said noise distribution estimate in an inner loop of a power control bit determining configuration that further comprises an outer loop providing a set-point for said inner loop.

12. A frame error rate estimator for estimating a frame error rate of received frames, said frame error rate estimator comprising:

an error correction decoder for decoding a received frame;

a good frame determiner for determining whether said error correction decoded frame is a good frame on the basis of a frame quality indicator, wherein the received frame further comprises said frame quality indicator;

an error correction encoder for encoding a frame determined to be a good frame by said good trains determiner; and a frame rate estimator being configured to estimate said frame error rate on the basis of said error correction encoded good frame and said received frame.

13. A frame error rate estimator as claimed in claim 12, further comprising a bit error rate determiner for determining a bit error rate, said bit error rate determiner using said received frame and said error correction encoded good frame, said frame error rate estimator being configured to estimate said frame error rate using said determined bit error rate.

14. A frame error rate estimator as claimed in claim 12, further being configured to estimate said frame error rate on fig the basis of an error correction decoded bad frame.

15. A frame error rate estimator for estimating a frame error rate of received frames, said frame error rate estimator comprising:

means for error correction decoding a received frame;

means for determining whether said error correction decoded frame is a good frame on the basis of a frame quality indicator, wherein the received frame further comprises said frame quality indicator;

means for encoding a frame determined to be a good frame by said means for determining; and means for estimating said frame error rate on the basis of said error correction encoded good frame and said received frame.

16. A frame error rate estimator as claimed in claim 15, further estimating said frame error rate on the basis of an error correction decoded bad frame.

17. A frame error rate estimator as claimed in claim 16, further comprising an N-tap filter configured to estimate said frame error rate by using frame error rate estimates of good and bad frames of a plurality of consecutively received frames.

18. A frame error rate estimator as claimed in claim 17, further comprising means for determining said noise distribution estimate from said error correction encoded good frame and said received frame, means for determining filter coefficients of said N-tap filter from said noise distribution estimate.

19. An apparatus comprising a frame error rate estimator for estimating a frame error rate of received frames, said frame error rate estimator comprising:

an error correction decoder for decoding a received frame;

a good frame determiner for determining whether said error correction decoded frame is a good frame on the basis of a frame quality indicator, wherein the received frame further comprises said frame quality indicator; and an error correction encoder for encoding a frame determined to be a good frame by said frame determiner;

said frame rate estimator being configured to estimate said frame error rate on the basis of said error correction encoded good frame and said received frame.

20. An apparatus as claimed in claim 19, said apparatus being a first wireless apparatus arranged for communication with a second wireless apparatus over an air interface, said first wireless apparatus comprising a receive path that, in an outer power control bit determining loop, comprises said frame error rate estimator, and, in an inner loop further comprises an energy-to-noise estimator for estimating a ratio of received energy per bit to noise power, said frame error rate estimate being used for adjusting a set-point of said inner loop.

21. An apparatus as claimed in claim 20, said first wireless apparatus further comprising a transmit path with a transmitter that is configured to transmit said power control bit to said second wireless apparatus.

* * * * *